United States Patent [19]

Premiski et al.

[11] Patent Number: 4,825,725
[45] Date of Patent: May 2, 1989

[54] PLANETARY TRANSMISSION WITH SIMPSON-TYPE GEARING

[75] Inventors: Vladimir Premiski, BAM-Willerscheid; Rainer Höhnel, Pulheim; Wilhelm Wehren, Kerpen; Kurt Graef, Pulheim, all of Fed. Rep. of Germany

[73] Assignee: Ford Motor Company, Dearborn, Mich.

[21] Appl. No.: 72,958

[22] Filed: Jul. 15, 1987

[30] Foreign Application Priority Data

Jul. 15, 1986 [DE] Fed. Rep. of Germany ....... 3623788

[51] Int. Cl.[4] ............... F16H 57/10; F16H 57/04
[52] U.S. Cl. .................................. 74/762; 74/467
[58] Field of Search ............ 74/762, 763, 750 R, 74/753, 467; 184/6.12

[56] References Cited

U.S. PATENT DOCUMENTS

| | | | |
|---|---|---|---|
| 3,035,457 | 5/1962 | Cartwright | 74/763 |
| 3,407,686 | 10/1968 | Tuck et al. | 74/467 |
| 3,664,210 | 5/1972 | Laing | 74/763 X |
| 3,706,240 | 12/1972 | Borneman et al. | 74/763 |
| 3,848,518 | 11/1974 | Martin | 74/763 X |
| 3,922,932 | 12/1975 | Maurice et al. | 74/763 |
| 4,304,153 | 12/1981 | Moroto et al. | 74/763 X |
| 4,315,443 | 2/1982 | Kubo et al. | 74/762 X |
| 4,380,173 | 4/1983 | Kubo et al. | 74/762 |
| 4,484,494 | 11/1984 | Sakakibara | 74/763 X |
| 4,590,820 | 5/1986 | Hambric | 74/467 X |
| 4,649,763 | 3/1987 | Graef et al. | 74/762 X |

FOREIGN PATENT DOCUMENTS 3417703 11/1985 Fed. Rep. of Germany .

Primary Examiner—Leslie A. Braun
Assistant Examiner—David Novais
Attorney, Agent, or Firm—Donald J. Harrington; Keith L. Zerschling

[57] ABSTRACT

A compound planetary gear system for an automotive vehicle comprising a pair of planetary gear units with a common sun gear and a driven shaft disposed concentrically within the sun gear whereby an annular lubrication oil flow passage is formed in the sun gear, the sun gear being supported by its meshing engagement with multiple planet pinions journalled in a carrier, and a flow directing funnel registering with the oil flow passage which is adapted to direct lubrication fluid into the sun gear, when it is distributed to desired lubrication points.

3 Claims, 1 Drawing Sheet

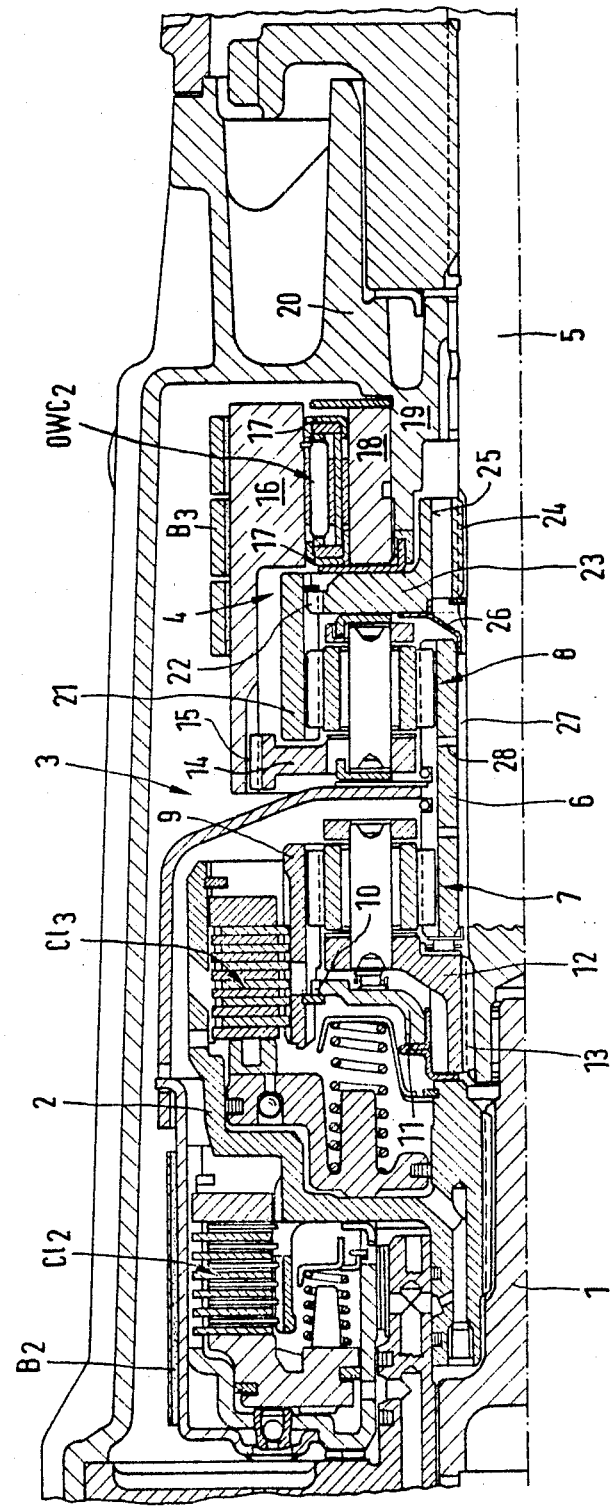

PLANETARY TRANSMISSION WITH SIMPSON-TYPE GEARING

BACKGROUND OF THE INVENTION

The invention relates to a planetary transmission for automotive vehicles. The transmission has compound gear elements of the well known Simpson type.

A multiple speed torque converter transmission for rear wheel drive vehicles is shown in German Offenlegungsschrift Published Specification 34 17 703. That transmission has a Simpson-type planet gear system. The input member of the Simpson-type planet gear system comprises two clutches $CL_2$ and $CL_3$, by which driving torque is selectively connected to the common sun gear of the planet gear system or to the annulus of the front set during operation in the forward gear speeds. In addition, the Simpson-type planet gear system of the prior art publication comprises two brakes $B_2$ and $B_3$ for locking the common sun gear during operation in the second gear speed and for locking the planet gear carrier of the rear set during operation in the first gear speed and the reverse gear speed, respectively. It further comprises an overrunning clutch $OWC_2$ arranged parallel to the friction brake $B_3$ so as to produce a driving torque flow path in the first gear speed only in one direction. In this case the planet gear carrier of the forward set and the annulus of the rear set of the Simpson-type planet gear system are connected drivably to the driving shaft.

The front portion of the driven shaft adjacent the common gun gear of the prior art design is provided with a center bore and with radial ports for supplying lubricating oil to the common sun gear mounted on the driven shaft by means of bearing bushings and to the planet gears that engage the sun gear.

The center bore of the driven shaft of the prior art design connected to the radial ports causes a noticeable weakening of the driven shaft, so that it can transmit torque only in a restricted torque range. On the other hand, the loads arising in the other elements of the planet-gear system are not so high. In a specific design these other elements would be capable of transmitting torque in a higher torque range.

It is an object of the invention to use the torque transmitting elements of a known design, as disclosed in the reference publication, which was designed for a torque range not exceeding 450 Newton-meters, and to adapt it for transmitting torque in a higher range of up to 750 Newton-meters while retaining as many as possible of the components of the known planet gear system.

GENERAL DESCRIPTION OF THE INVENTION

The ring gear of the front planet gear set is connected to a hub of the ring gear by means of a splined connection and is piloted on and supported by an extension of the planet gear carrier of the front set. The planet gear carrier of the rear set is connected to the brake drum of a low and reverse brake by means of a flange and a splined connection. The brake drum is piloted and supported by an overrunning clutch that has spaced brushings which form a part of the overrunning lateral bearings on an attachment on clutch casing.

The common sun wheel of the Simpson-type planet gear system extends between the front planet gear carrier and the hub of the ring gear of the rear gearset. It does not have internal bearings. The driven shaft, which serves as a torque output shaft, extends through the common sun gear. In contrast to the prior art construction of German specification DE3417703, the driven shaft is a solid shaft without radial ports. The lubricating oil is supplied to the planet gear system by means of axial bores in the hub of the ring gear of the rear gearset and by means of a tapered funnel provided in hub of the ring gear. The funnel extends towards the annular space between the driven shaft and the common sum gear.

The sun gear is mounted in a suspended manner by the planet gears. The sun gear floats in concentric disposition with respect to the driven shaft without the need for end bushing supports. A larger effective cross-sectional area of the driven shaft is made available because radial ports and a center shaft opening are not required. Thus it is possible to deliver torque in a higher torque range through the driven shaft without the need to increase the external diameter of the driven shaft. In this way the remaining transmission elements of the Simpson-type planet gear system can be used substantially unchanged in their dimensions with respect to the gear system of German specification DE3417703. In addition, the transmission casing for our improved transmission can be similar in shape and size to the casing of that prior art transmission.

BRIEF DESCRIPTION OF THE DRAWING

The invention is explained in greater detail with reference to an embodiment illustrated in the accompanying drawing, in which the FIGURE is a vertical partial section through a multiple speed planetary transmission having a Simpson-type planet gear system that incorporates the improvements of the present invention.

PARTICULAR DESCRIPTION OF THE INVENTION

A drive shaft 1, which in the case of three-speed, hydrokinetic-mechanical transmission for motor vehicles is connected to the turbine shaft of a hydrokinetic torque converter, or in the case of a four-speed, hydrokinetic-mechanical transmission for motor vehicles with an added gearset is connected to the output element of the added gearset. The drive shaft 1 is connected drivably to the input element 2 of the planetary gear system 3,4. The output element of the system is connected drivably to the driven shaft 5.

The input element 2 forms a part of each of two disc clutches $CL_2$ and $CL_3$, which can be actuated in known manner by means of annular pistons actuated by fluid pressure. The clutches connect the drive shaft 1 and the input element 2 selectively to the common sun gear 6 of the two planetary gearsets 7 and 8 or to the ring gear 9 of the front gearset 7, respectively, during operation in the forward driving ratios.

The ring gear 9 of the front gearset 7 is connected by means of a splined connection 10 to a hub 11 of the ring gear, which hub is journalled and supported on a shoulder of the planet gear carrier 12 of the front gearset which is connected by way of a splined connection 13 to the driven shaft 5.

The planet gear system 3,4 comprises two brakes $B_2$ and $B_3$. Brake $B_2$ holds sun gear 6 stationary during operation in the second speed ratio. The planet gear carrier 14 of the rear gearset 8 is fixed by means of brake $B_3$ during operation in the first speed ratio and in the reverse ratio. The planet gear carrier 14 is connected by means of a splined connection 15, to the brake drum 16 of the brake $B_3$. Brake $B_3$ is supported concentrically on the inner ring 18 by means of bearing rings 17 disposed on each side of the rollers of overrunning clutch $OWC_2$, the inner ring 18 being disposed on an extension 19 of the transmission casing.

The ring gear 21 of the rear gearset 8 is connected by means of a splined connection 22 to a hub 23 of the ring gear, which hub is connected by means of a splined connection 24 to driven shaft 5. The ring gear 21 with its hub 23 forms the output element of the planet gear system 3,4.

Because of the concentric arrangement of the planet gear carrier 12 of the front gearset 7 and the concentric bearing support of the planet gear carrier 14 of the rear gearset 8, the common sun gear 6 can be suspended without bearings by means of the planet gears which engage the said sun gear 6. Lubricating oil can be supplied to the planet gear system 3,4 by means of axial bores 25 in the hub 23 of the ring gear. A tapered funnel 26 inserted in the hub 23 of the ring gear guides the lubricating oil into the space 27 between the driven shaft 5 and the common sun gear 6, whence it is guided radially outwards by way of radial bores 28 in the sun gear 6 whereby the planet gear sets 7 and 8 with their thrust washer arrangements are adequately supplied with lubricating oil.

A center bore and radial ports in the driven shaft, which were hitherto necessary for the supply of lubricating oil, can thus be dispensed with and the driven shaft 5 can be used for transmitting higher torque while its diameter remains the same.

What we claim is:

1. A planetary gear system for an automotive vehicle comprising:
   a first gearset having a sun gear, a ring gear, a planet carrier and planet gears mounted on the carrier;
   a second gearset having a sun gear, a ring gear, a planet carrier and planet gears mounted on the carrier;
   the sun gear of the first gearset and the sun gear of the second gearset being common and having a central opening extending axially therethrough;
   a driven shaft extending through the central opening of the common sun gear and connected to the carrier of the first gearset and the ring gear of the second gearset;
   separate selectively operable means for braking the carrier of the second gearset and the common sun gear and separate clutch means for selectively distributing driving torque to the ring gear of said first gearset and to said common sun gear;
   means for distributing lubrication oil to the central opening in said common sun gear, said driven shaft and said central opening defining an annular lubrication oil flow passage extending coaxially with respect to said common sum gear, said common sun gear engaging and being suspended by the planet gears of said first and second gearsets whereby a through passage is formed through the central opening of the common sun gear without the intervention of bearings for radial sun gear support.

2. The combination as set forth in claim 1 wherein the connection between the ring gear of said second gearset and said driven shaft comprises a ring gear hub, an axial lubrication and oil passage in said hub, and means for establishing fluid communication between said axial lubrication oil passage and said annular lubrication oil passage.

3. The combination as set forth in claim 2 wherein said fluid communication establishing means comprises a funnel with a small end opening registering with one end of the central opening in said common sun gear and a larger end opening registering with one end of said axial lubrication oil passage in said hub.

* * * * *